United States Patent
Kuroyanagi et al.

(10) Patent No.: US 10,998,791 B2
(45) Date of Patent: May 4, 2021

(54) STATOR AND ROTATING ELECTRIC MACHINE

(71) Applicants: AISIN AW CO., LTD., Anjo (JP); HAYASHIKOGYOSYO CO., LTD., Nakatsugawa (JP)

(72) Inventors: Toru Kuroyanagi, Okazaki (JP); Ko Kajita, Mizunami (JP); Takahiko Hobo, Nakatsugawa (JP)

(73) Assignees: AISIN AW CO., LTD., Anjo (JP); HAYASHIKOGYOSYO CO., LTD., Nakatsugawa (JP)

( * ) Notice: Subject to any disclaimer, the term of this patent is extended or adjusted under 35 U.S.C. 154(b) by 379 days.

(21) Appl. No.: 15/778,907

(22) PCT Filed: Dec. 22, 2016

(86) PCT No.: PCT/JP2016/088313
§ 371 (c)(1),
(2) Date: May 24, 2018

(87) PCT Pub. No.: WO2017/110987
PCT Pub. Date: Jun. 29, 2017

(65) Prior Publication Data
US 2019/0006903 A1    Jan. 3, 2019

(30) Foreign Application Priority Data

Dec. 25, 2015    (JP) .............................. JP2015-255011

(51) Int. Cl.
*H02K 3/50*    (2006.01)
*H02K 3/34*    (2006.01)
(Continued)

(52) U.S. Cl.
CPC ................. *H02K 3/50* (2013.01); *H02K 1/16* (2013.01); *H02K 1/2753* (2013.01); *H02K 3/12* (2013.01);
(Continued)

(58) Field of Classification Search
CPC .......... H02K 3/50; H02K 1/16; H02K 1/2753; H02K 3/28; H02K 3/34; H02K 3/345;
(Continued)

(56) References Cited

U.S. PATENT DOCUMENTS

| 5,659,219 A | 8/1997 | Momose et al. |
| 6,943,477 B1 * | 9/2005 | Nakamura ............... H02K 3/28 310/180 |

(Continued)

FOREIGN PATENT DOCUMENTS

| JP | S50-8003 A | 1/1975 |
| JP | S53-64201 U | 5/1978 |

(Continued)

OTHER PUBLICATIONS

Apr. 4, 2017 International Search Report issued in International Patent Application No. PCT/JP2016/088313.

*Primary Examiner* — Quyen P Leung
*Assistant Examiner* — Alexander A Singh
(74) *Attorney, Agent, or Firm* — Oliff PLC

(57) ABSTRACT

A stator of the present invention includes a conductor wire. A portion of the conductor wire disposed adjacent to a coil winding center is connected to a power supply. A portion of the conductor wire disposed outwardly away from the coil winding center is connected to a neutral point.

10 Claims, 10 Drawing Sheets

(51) Int. Cl.
*H02K 3/28* (2006.01)
*H02K 1/16* (2006.01)
*H02K 1/27* (2006.01)
*H02K 3/12* (2006.01)

(52) U.S. Cl.
CPC ............. *H02K 3/28* (2013.01); *H02K 3/34* (2013.01); *H02K 3/345* (2013.01); *H02K 2203/06* (2013.01)

(58) Field of Classification Search
CPC ...... H02K 3/12; H02K 2203/06; H02K 3/487; H02K 3/493; H02K 2213/03; H02K 15/024
USPC .................................................. 310/214, 215
See application file for complete search history.

(56) References Cited

U.S. PATENT DOCUMENTS

| | | | | |
|---|---|---|---|---|
| 2002/0014806 | A1* | 2/2002 | Senoo | H02K 15/10 310/215 |
| 2004/0189134 | A1* | 9/2004 | Onishi | H02K 3/345 310/215 |
| 2004/0256943 | A1* | 12/2004 | Omura | H02K 3/345 310/215 |
| 2015/0042196 | A1* | 2/2015 | Awazu | H02K 3/48 310/198 |

FOREIGN PATENT DOCUMENTS

| | | |
|---|---|---|
| JP | S53-148533 U | 11/1978 |
| JP | S57-110047 A | 7/1982 |
| JP | S58-25541 U | 2/1983 |
| JP | S58-118529 U | 8/1983 |
| JP | S58-157349 A | 9/1983 |
| JP | 2941164 B2 | 8/1999 |
| JP | 2004-297964 A | 10/2004 |
| JP | 2005-012887 A | 1/2005 |
| JP | 2014-143885 A | 8/2014 |
| JP | 2014-204512 A | 10/2014 |
| JP | 2015-35837 A | 2/2015 |
| JP | 2015-177598 A | 10/2015 |
| WO | 2015/104734 A1 | 7/2015 |

* cited by examiner

STATOR AND ROTATING ELECTRIC MACHINE

BACKGROUND

The present disclosure relates to stators and rotating electric machines.

A stator and a rotating electric machine that include a coil formed by winding a conductor wire are known in the related art. Such stator and rotating electric machine are disclosed in Japanese Patent No. 2941164, for example.

Japanese Patent No. 2941164 discloses a stator including three-phase windings (coils) disposed in slots of a stator core. The windings of the stator are provided by winding conductor wires more than once. Insulating paper is provided between coil end portions of the windings of the respective phases (i.e., portions of the windings protruded from an end face of the stator core facing in the direction of a rotation axis). The insulating paper is configured such that insulation is provided between the coil end portions of the windings of the respective phases.

SUMMARY

The technique disclosed in Japanese Patent No. 2941164, for example, involves providing the insulating paper between the coil end portions of the windings of the respective phases, and involves molding (or deforming) the coil end portions after disposing the windings in the slots. In this case, however, the coil end portions of the windings (coils) of the respective phases may disadvantageously be short-circuited. This may unfortunately make it impossible to provide insulation between the coils.

An exemplary aspect of the disclosure provides a stator and a rotating electric machine that prevent defective insulation between coils.

A stator according to a first aspect of the present disclosure includes a stator core, and a coil disposed on the stator core. The coil includes a wound conductor wire. A portion of the conductor wire disposed adjacent to a winding center of the coil is connected to a power supply. A portion of the conductor wire disposed outwardly away from the winding center of the coil is connected to a neutral point.

In the stator according to the first aspect of the present disclosure, the portion of the conductor wire disposed adjacent to the winding center of the coil is connected to the power supply, and the portion of the conductor wire disposed outwardly away from the winding center of the coil is connected to the neutral point as described above. When coil end portions of each coil are molded after each coil is inserted into an associated slot, outwardly disposed portions of the conductor wires of the coils may be located close to each other. Even in such a case, a potential difference between the conductor wires is small because the outwardly disposed portions of the conductor wires are connected to the neutral point. Consequently, the first aspect prevents occurrence of defective insulation between the coils.

A rotating electric machine according to a second aspect of the present disclosure includes a rotor, and a stator disposed to face the rotor. The stator includes a stator core, and a coil disposed on the stator core. The coil includes a wound conductor wire. A portion of the conductor wire disposed adjacent to a winding center of the coil is connected to a power supply. A portion of the conductor wire disposed outwardly away from the winding center of the coil is connected to a neutral point.

In the rotating electric machine according to the second aspect of the present disclosure, the portion of the conductor wire disposed adjacent to the winding center of the coil is connected to the power supply, and the portion of the conductor wire disposed outwardly away from the winding center of the coil is connected to the neutral point as described above. When coil end portions of each coil are molded after each coil is inserted into an associated slot, outwardly disposed portions of the conductor wires of the coils may be located close to each other. Even in such a case, a potential difference between the conductor wires is small because the outwardly disposed portions of the conductor wires are connected to the neutral point. Consequently, the second aspect provides the rotating electric machine that prevents occurrence of defective insulation between the coils.

The present disclosure prevents occurrence of defective insulation between coils as described above.

DETAILED DESCRIPTION OF EMBODIMENTS

Embodiments of the present disclosure will be described below with reference to the drawings.

First Embodiment

Structure of Rotating Electric Machine

A structure of a rotating electric machine 100 according to a first embodiment will be described with reference to FIGS. 1 to 18. As used herein, the term "rotation axis direction" refers to the direction in which the rotation axis of the rotating electric machine 100 (or a rotor 10) extends. The term "radial direction" refers to the radial direction of a stator 20. The term "radially inward" refers to being located inward in the radial direction of the stator 20. The term "radially outward" refers to being located outward in the radial direction of the stator 20.

Figure 1:
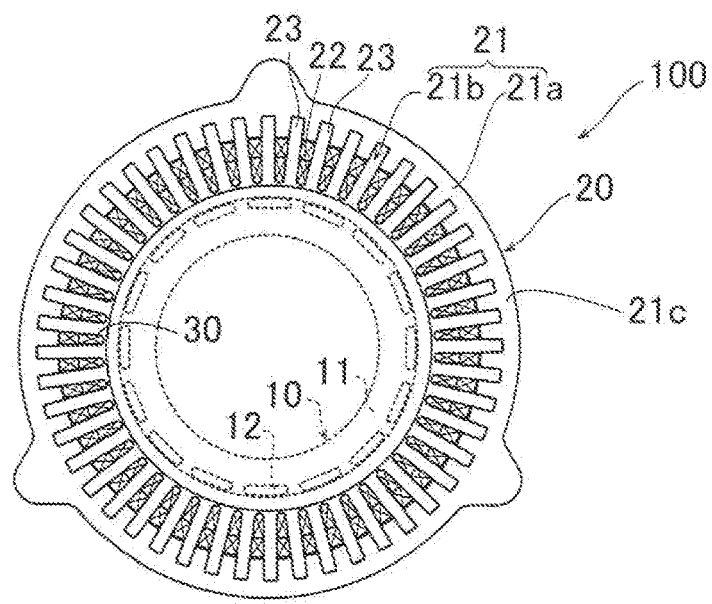
FIG. 1 is a plan view of a rotating electric machine (a stator) according to a first embodiment of the present disclosure.

As illustrated in FIG. 1, the rotating electric machine 100 includes the rotor 10. A rotor core 11 of the rotor 10 is provided with a plurality of permanent magnets 12. The permanent magnets 12 are disposed at substantially equiangular intervals in a circumferential direction.

The rotating electric machine 100 further includes the stator 20 (and a stator core 21) disposed to face the outer peripheral surface of the rotor core 11 in the radial direction. The stator core 21 includes: a radially outward core 21a disposed radially outward; and a radially inward core 21b disposed radially inward. Fitting the radially outward core 21a and the radially inward core 21b to each other provides the stator core 21 including a plurality of (in the first embodiment, 48) slots 22 (closed slots). Teeth 23 are provided such that each slot 22 is interposed between the teeth 23 adjacent thereto.

Figure 2:
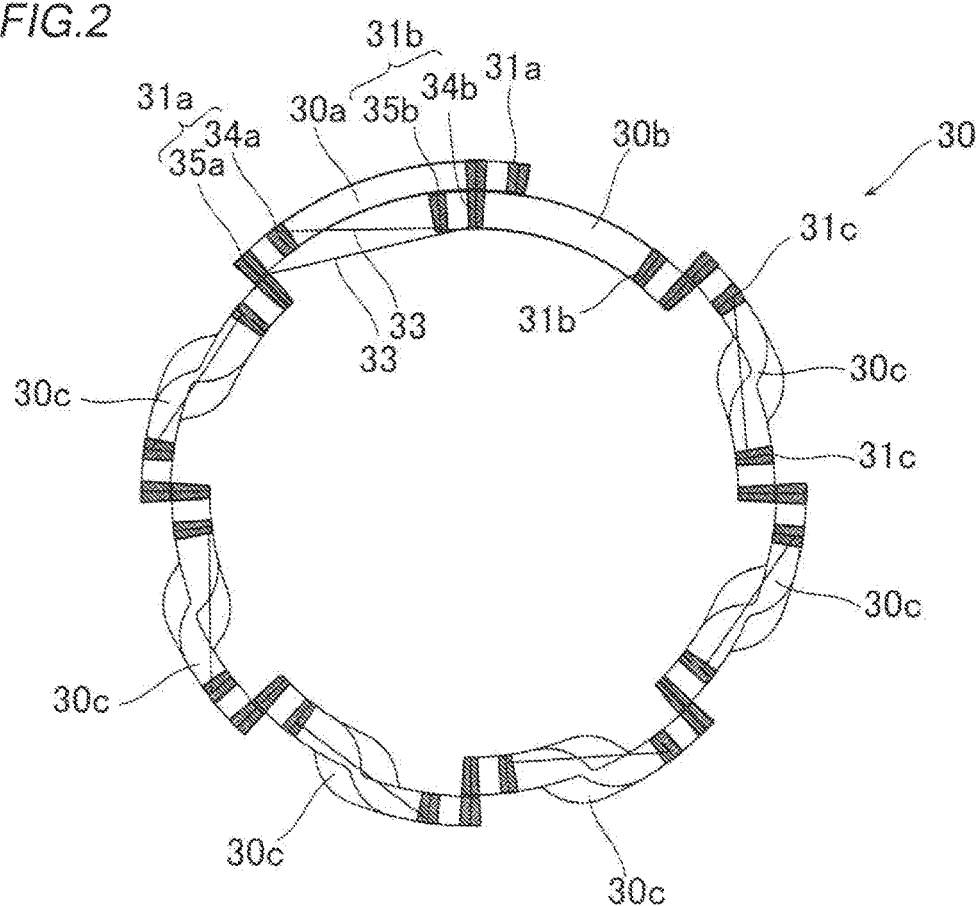
FIG. 2 is a diagram illustrating a coil according to the first embodiment of the present disclosure.

As illustrated in FIG. 2, the stator 20 includes a plurality of coils 30 (in the first embodiment, eight coils 30 for each phase) disposed on the stator core 21. Each coil 30 includes a first coil 30a that is a single-layer lap-wound coil whose slot-held portion 31a is disposed in a radially outward portion of the associated slot 22. Each coil 30 includes a second coil 30b that is a single-layer lap-wound coil whose slot-held portion 31b is disposed in a radially inward portion of the associated slot 22. Each coil 30 includes a plurality of (in the first embodiment, six) third coils 30c each of which is a double-layer lap-wound coil whose slot-held portion 31c on a first circumferential side is disposed in a radially outward portion of the associated slot 22 and whose slot-held portion 31c on a second circumferential side is disposed in a radially inward portion of the associated slot 22. FIG. 2 illustrates only the coil 30 of one phase included in the three-phase coils 30. Each of the first coil 30a, the second coil 30b, and the third coils 30c is an example of a "coil."

Figure 3:
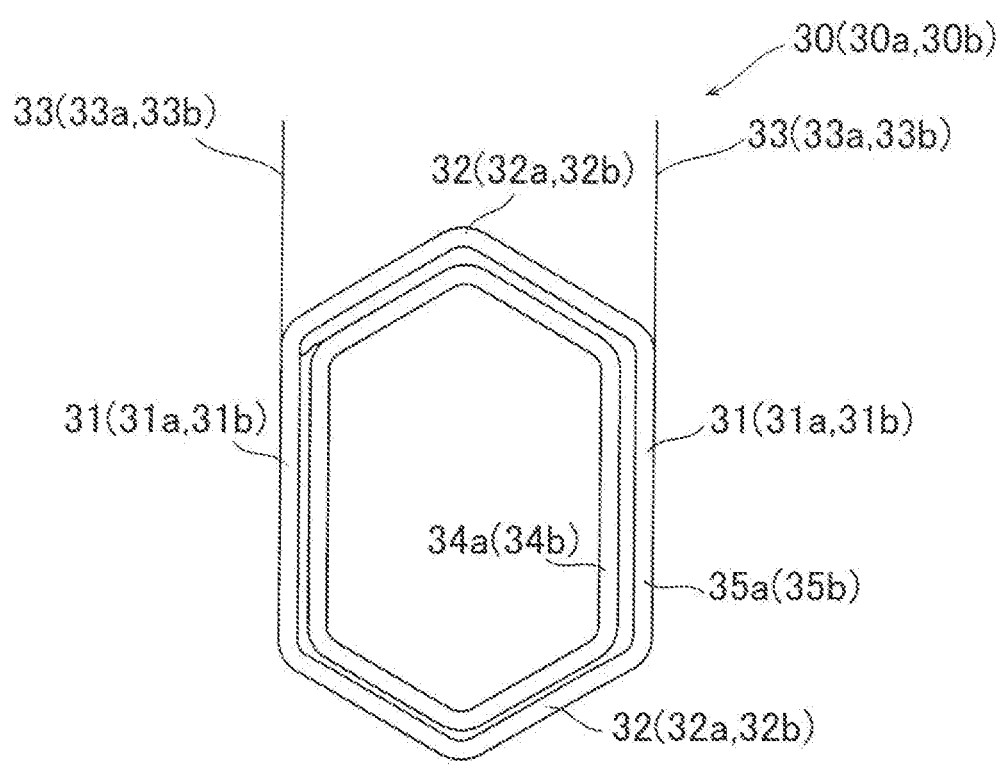
FIG. 3 is a diagram illustrating a first coil (a second coil) according to the first embodiment of the present disclosure.

As illustrated in FIG. 3, the first coil 30a includes: the slot-held portion 31a; a coil end portion 32a protruded from an end face 21c of the stator core 21 facing in the rotation axis direction; and a lead wire portion 33a. The first coil 30a further includes a first inner coil portion 34a concentrically inwardly wound and a first outer coil portion 35a concentrically outwardly wound.

As illustrated in FIG. 3, the second coil 30b includes the slot-held portion 31b, a coil end portion 32b, and a lead wire portion 33b similarly to the first coil 30a. The second coil 30b further includes a second inner coil portion 34b concentrically inwardly wound and a second outer coil portion 35b concentrically outwardly wound.

Figure 4:
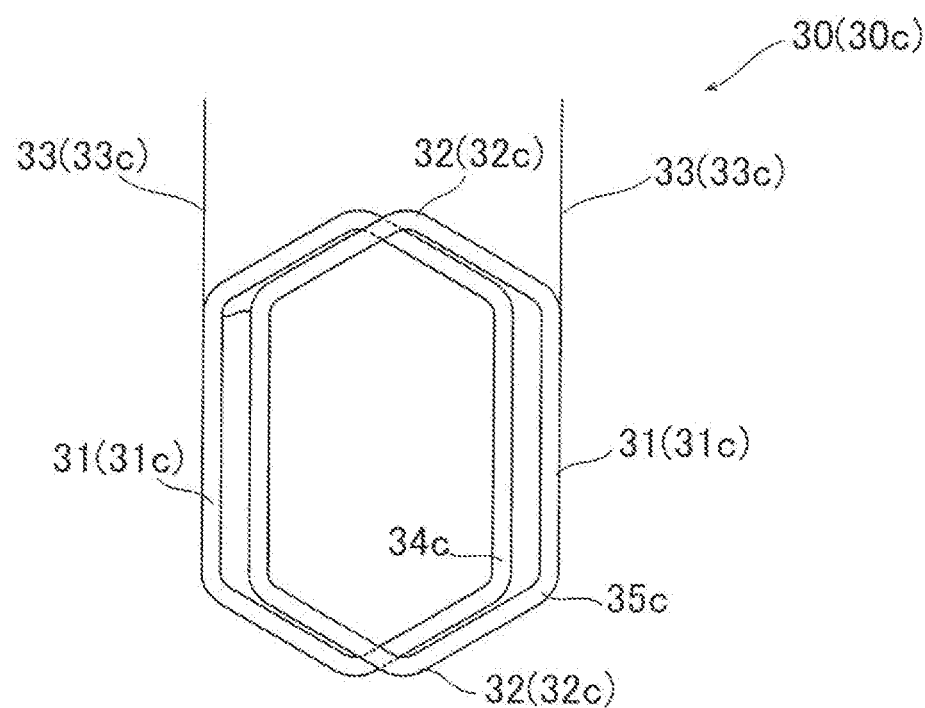
FIG. 4 is a diagram illustrating a third coil according to the first embodiment of the present disclosure.

As illustrated in FIG. 4, each third coil 30c includes the slot-held portions 31c, a coil end portion 32c, and a lead wire portion 33c. Each third coil 30c further includes: a third coil portion 34c disposed on the first circumferential side; and a third coil portion 35c disposed on the second circumferential side. The third coil portion 34c and the third coil portion 35c are connected in series.

The first coil 30a, the second coil 30b, and the third coils 30c are connected in parallel to each other. The three-phase coils 30 are provided by a Y-connection.

Structure of Coil

Figure 5:
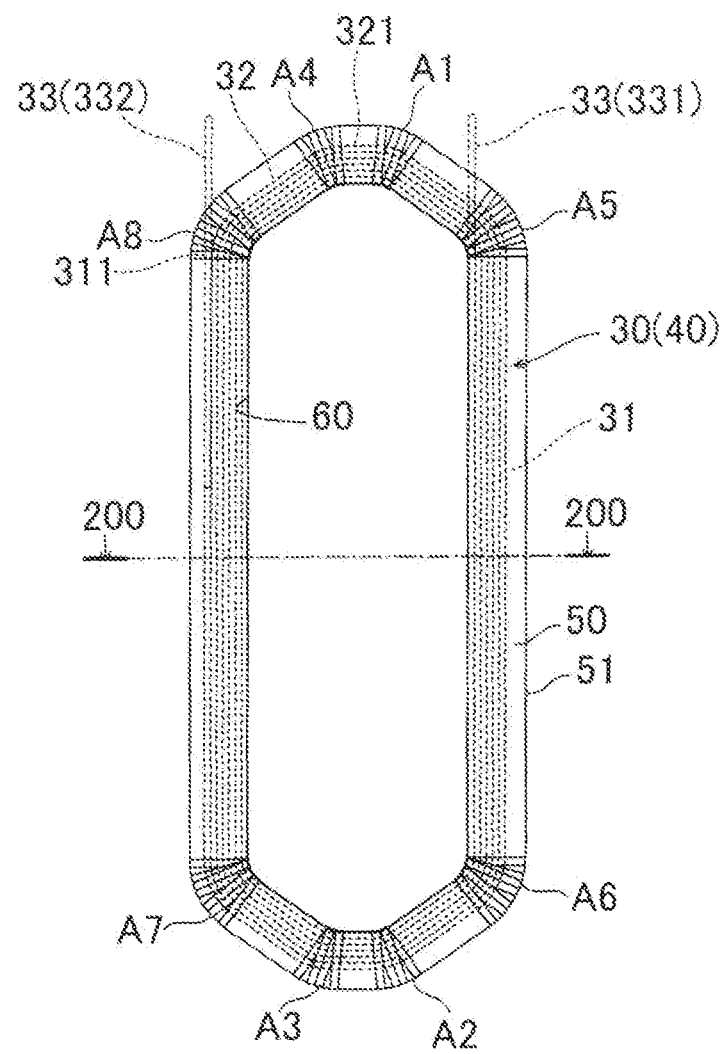
FIG. 5 is a diagram illustrating a coil (before molding) according to the first embodiment of the present disclosure.

Referring to FIG. 5, a structure of the coil 30 will be described in detail below FIG. 5 illustrates the coil 30 in a pre-molded (or pre-deformed) state described below. FIG. 5 illustrates the first inner coil portion 34a (or the first outer coil portion 35a) of the first coil 30a that is a single-layer lap-wound coil, FIG. 5 illustrates the second inner coil portion 34b (or the second outer coil portion 35b) of the second coil 30b that is a single-layer lap-wound coil. FIG. 5 illustrates the third coil portion 34c (or the third coil portion 35c) of the third coil 30c that is a double-layer lap-wound coil.

Each coil 30 includes: slot-held portions 31 each held in the associated slot 22 of the stator core 21; coil end portions 32 protruded from the end face 21c of the stator core 21 facing in the rotation axis direction; and a lead wire portion 33 pulled out of the stator core 21. The lead wire portion 33 includes a first end and a second end of a conductor wire 40 included in the coil 30. The lead wire portion 33 functions as, for example, a power line for connection to an external circuit, such as a power supply, and a neutral line for connection to a point of connection with the coil 30 of the other phase (which will hereinafter be referred to as a "neutral point").

The conductor wire 40 of the coil 30 is wound in layers stacked outwardly away from the winding center of the coil 30. The conductor wire 40 is a round wire, for example. In the first embodiment, a portion of the conductor wire 40 disposed adjacent to the winding center of the coil 30 is connected to the power supply, and a portion of the conductor wire 40 disposed outwardly away from the winding center of the coil 30 is connected to the neutral point. Specifically, a lead wire portion 331 disposed adjacent to the center of the coil 30 (or disposed closest to the center of the coil 30) is connected to the power supply. A lead wire portion 332 disposed outward (or disposed outermost) in the coil 30 is connected to the neutral point.

Figure 6:
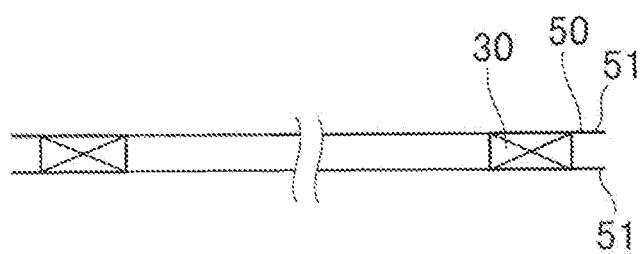
FIG. 6 is a cross-sectional view taken along the line 200-200 in FIG. 5.

As illustrated in FIGS. 5 and 6, the first embodiment involves providing an annular insulating member 50 extending outward from the center of the coil 30 such that the insulating member 50 covers the slot-held portions 31 and the coil end portions 32 of the coil 30 in a substantially U-shaped manner.

Specifically, the annular insulating member 50 has a sheet shape (see FIG. 8) to be bent in a substantially U-shaped manner. To be more specific, the sheet insulating member 50 has a substantially rectangular shape (e.g., an oblong shape) as described below. A portion of the coil 30 corresponding to a portion of the conductor wire 40 adjacent to the winding center of the coil 30 and connected to the power supply is disposed inside an inner portion of the insulating member 50 bent in a substantially U-shaped manner. A portion of the coil 30 corresponding to a portion of the conductor wire 40 outwardly away from the winding center of the coil 30 and connected to the neutral point is disposed adjacent to an opening (i.e., an end 51) of the insulating member 50 bent in a substantially U-shaped manner (see FIG. 6).

In other words, the conductor wire 40 is wound in layers stacked outward from the center, so that a portion of the conductor wire 40 adjacent to the center (where the winding starts) is disposed in abutment with the inner portion of the insulating member 50 bent in a substantially U-shaped manner. The conductor wire 40 is wound in layers stacked outward from the center, so that an outer portion of the conductor wire 40 (where the winding ends) is disposed adjacent to the opening of the insulating member 50 bent in a substantially U-shaped manner.

Figure 7:
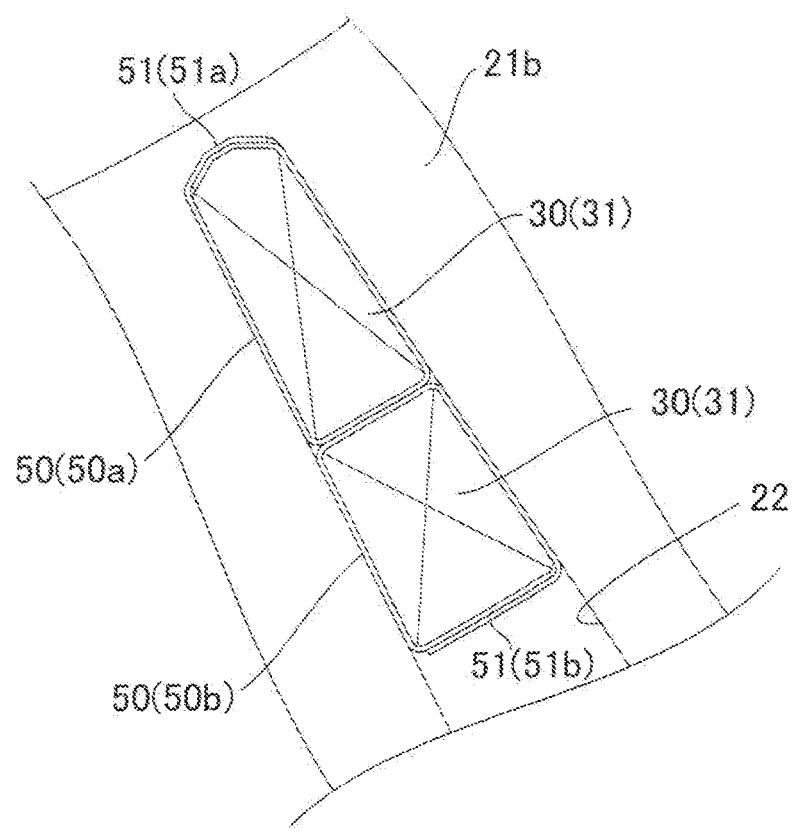
FIG. 7 is an enlarged cross-sectional view of the coils disposed in a stator.

In the first embodiment, in the sheet insulating member 50 bent in a substantially U-shaped manner, the ends 51 at the opening of the substantially U shape are protruded outward of the outermost wound portion of the coil 30 as illustrated in FIG. 6. In other words, the conductor wire 40 is wound in sequential layers stacked outward from the inner portion of the insulating member 50, which is bent in a substantially U-shaped manner, to such an extent that the conductor wire 40 does not reach the opening. As illustrated in FIG. 7, the portions of the insulating member 50 protruded outward of the outermost wound portion of the coil 30 are bound together after the coil 30 (i.e., the conductor wire 40) is wound inside the insulating member 50. Specifically, the outwardly protruded portions of the insulating member 50 are bound together in an overlapping manner such that the conductor wire 40 is not exposed.

In the first embodiment, the insulating member 50 is structured such that the insulating member 50 deforms in accordance with deformation of the coil 30 during its molding process as illustrated in FIG. 5. Specifically, at least portions of the insulating member 50 each corresponding to a region adjacent to a boundary 311 between the slot-held portion 31 and the coil end portion 32 (i.e., portions A5 to A8) or portions of the insulating member 50 each corresponding to a region adjacent to a top 321 of the coil end portion 32 (i.e., portions A1 to A4) are folded more than once. In the first embodiment, the portions A5 to A8 of the insulating member 50 and the portions A1 to A4 of the insulating member 50 are both folded more than once. With the insulating member 50 provided to cover the coil 30, regions of the folded portions A1 to A8 of the insulating member 50 adjacent to the center are in a folded state (see FIGS. 13 and 14). Outer regions of the folded portions A1 to A8 of the insulating member 50 are spread in the circumferential direction of the annular insulating member 50.

In the first embodiment, the folded portions A1 to A8 of the insulating member 50 are folded in a bellows-like manner. The configuration of the portions A1 to A8 will be described in detail below.

In the first embodiment, the coils 30 are disposed adjacent to each other as illustrated in FIG. 7. The slot-held portion 31 of one of the adjacent coils 30 and the slot-held portion 31 of the other adjacent coil 30 are disposed in the same slot 22. An insulating member 50a covering the slot-held portion 31 disposed in a radially inward portion of the same slot 22 is provided with an end 51a open to a radially inward portion of the stator core 21. An insulating member 50b covering the slot-held portion 31 disposed in a radially outward portion of the slot 22 is provided with an end 51b open to a radially outward portion of the stator core 21.

As illustrated in FIG. 2, the slot-held portion 31b of the second coil 20b and the slot-held portion 31a of the first coil 20a are respectively disposed in the radially inward portion and the radially outward portion of the same slot 22. The slot-held portion 31c of the third coil 20c located on the first circumferential side and the slot-held portion 31c of the third coil 20c located on the second circumferential side are respectively disposed in the radially inward portion and the radially outward portion of the same slot 22. In any case, the insulating member 50a covering the slot-held portion 31 disposed in the radially inward portion of the slot 22 is open to the radially inward portion of the stator core 21, and the insulating member 50b covering the slot-held portion 31 disposed in the radially outward portion of the slot 22 is open to the radially outward portion of the stator core 21. The insulating member 50a is an example of a "first insulating member" and the insulating member 50b is an example of a "second insulating "member."

Structure of Insulating Member

A structure of the bellows-like insulating member 50 folded more than once (i.e., method for manufacturing the insulating member 50) will be described in detail below.

Figure 8:
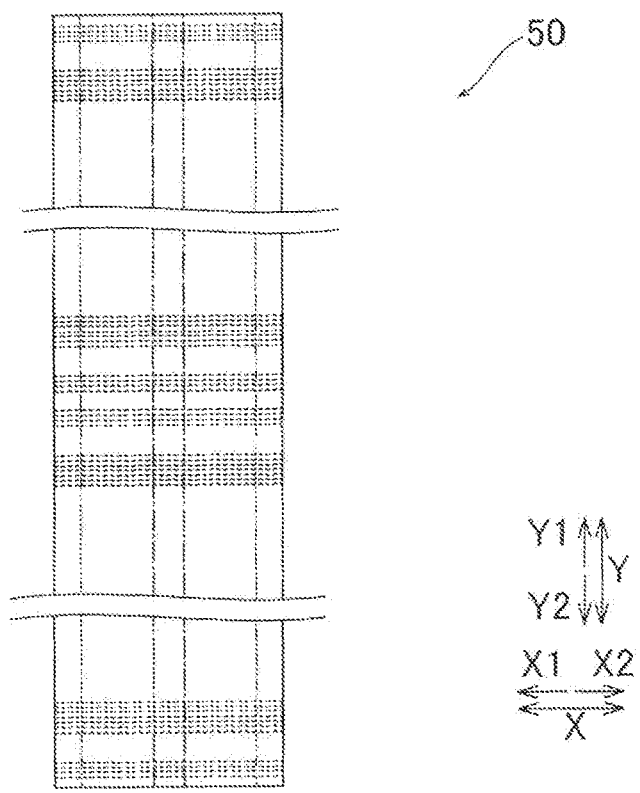
FIG. 8 is a development of an insulating member according to the first embodiment of the present disclosure.
Figure 9:
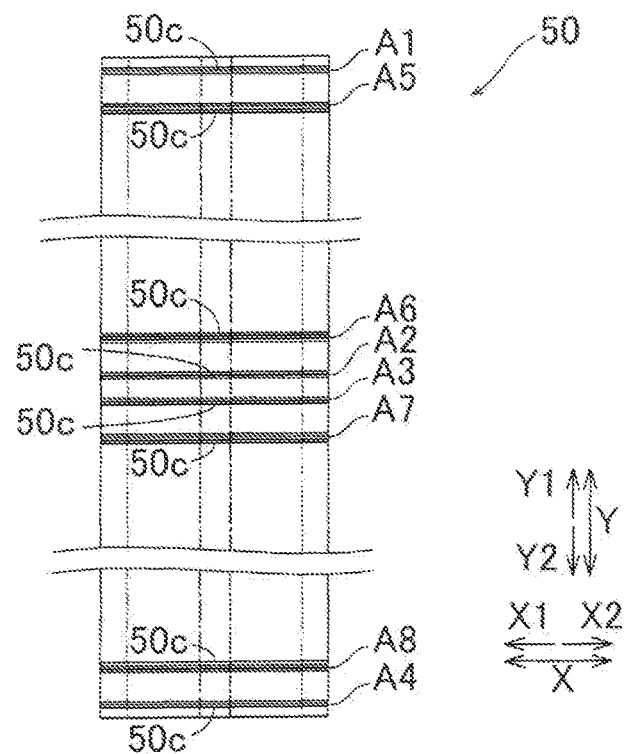
FIG. 9 is a plan view of the insulating member in FIG. 8, illustrating its folded state.
Figure 10:
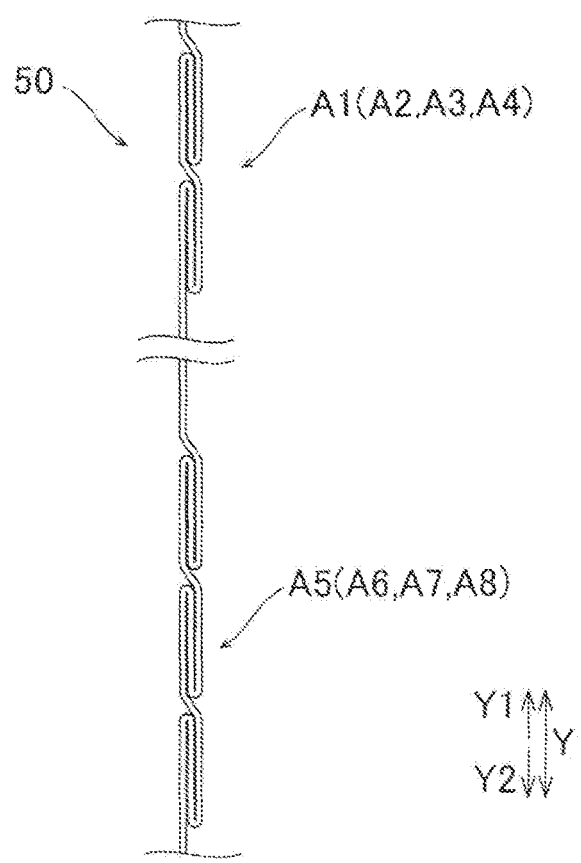
FIG. 10 is a side view of the insulating member in FIG. 8, illustrating its folded state.

As illustrated in FIG. 8, the insulating member 50 having a substantially oblong shape is prepared. As illustrated in FIG. 9, the insulating member 50 is then folded more than once in a Y direction along lines extending in an X direction (see dotted lines in FIG. 8). As illustrated in FIG. 10, the portions A1 to A4 of the insulating member 50 are folded in layers at a plurality of locations (e.g., at two locations). As illustrated in FIG. 10, the portions A5 to A8 of the insulating member 50 are folded in layers at a plurality of locations (e.g., at three locations). Thus, the insulating member 50 is folded in a bellows-like manner. The folded portions A1 to A8 of the insulating member 50 are each formed into a substantially flat shape. In other words, the folded portions A1 to A8 are folded so as to be reduced in thickness.

The portions A1 to A4 of the insulating member 50 each correspond to a portion of the coil 30 adjacent to the top 321 of the coil end portion 32. The portions A5 to A8 of the insulating member 50 each correspond to a portion of the coil 30 adjacent to the boundary 311 between the slot-held portion 31 and the coil end portion 32.

As illustrated in FIG. 9, each of the portions A1 to A8 of the insulating member 50 folded in a bellows-like manner includes a substantially central region 50c in the X direction. For example, the substantially central regions 50c are ultrasonically welded to each other. In other words, the portions of the insulating member 50 folded more than once (e.g., the substantially central regions 50c) are welded to each other.

Figure 11:
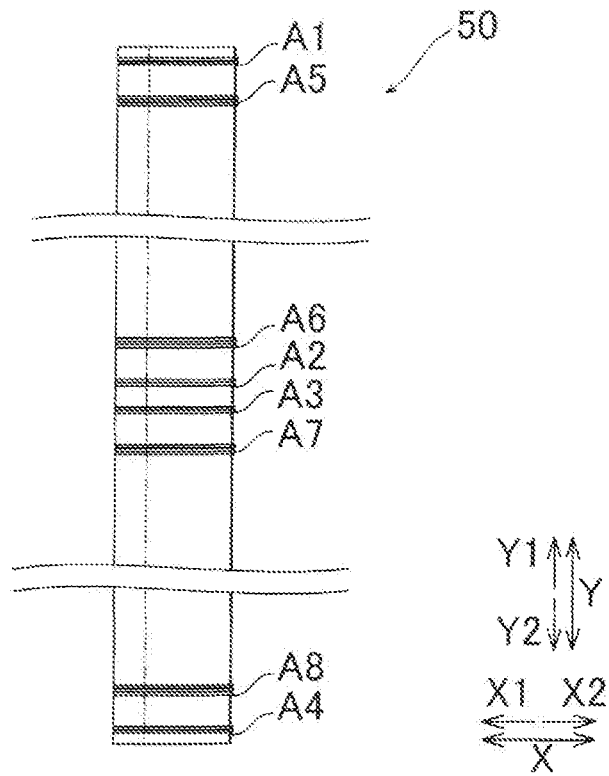
FIG. 11 is a diagram illustrating the insulating member in FIG. 9, with the insulating member bent in a substantially U-shaped manner.

As illustrated in FIG. 11, the insulating member 50 is bent in the X direction along lines extending in the Y direction (see the alternate long and short dashed lines in FIG. 9). Thus, the insulating member 50 is bent such that the insulating member 50 is substantially U-shaped in cross section.

Manufacture and Molding of Coil

The following description discusses how the coil 30 is manufactured and molded.

Figure 12:
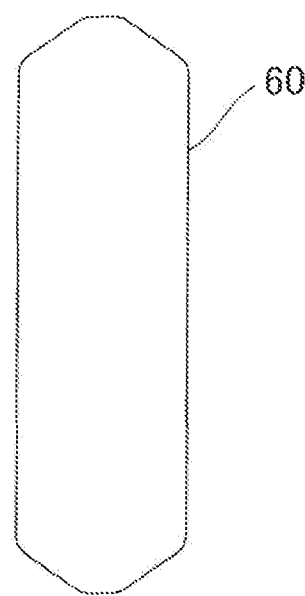
FIG. 12 is a plan view of a spool.

As illustrated in FIG. 12, a spool 60 is prepared. The spool 60 has a shape (e.g., an octagonal shape) conforming to the shape of the coil 30 to be molded.

Figure 13:
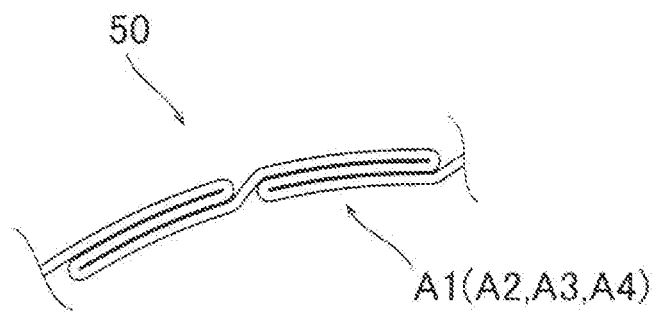
FIG. 13 is an enlarged view (1) of the insulating member disposed on the spool.
Figure 14:
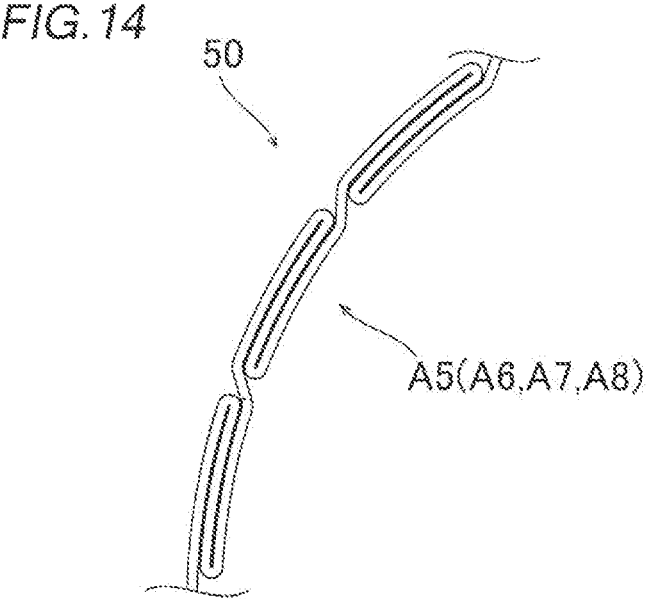
FIG. 14 is a enlarged view (2) of the insulating member disposed on the spool.

As illustrated in FIG. 5, the insulating member 50 is disposed on the spool 60. The insulating member 50 bent in a substantially U-shaped manner is disposed to be open outward. In this embodiment, the insulating member 50 having a linear shape is disposed on the octagonal spool 60. Thus, centrally located regions of the folded portions (i.e., the portions A1 to A8) of the insulating member 50 are each kept in a folded state, and outwardly located regions of the folded portions of the insulating member 50 each assume a circumferentially spread state. The substantially central regions 50c of the folded portions (i.e., the portions A1 to A8) of the insulating member 50 are welded (or joined) to each other. This, as illustrated in FIGS. 13 and 14, makes it difficult for the centrally located regions of the folded portions of the insulating member 50 to circumferentially spread.

As illustrated in FIG. 5, the conductor wire 40 is wound in layers stacked outward from the center. The conductor wire 40 is wound to such an extent that the conductor wire 40 located inside the inner portion of the insulating member 50 bent in a substantially U-shaped manner does not reach the opening of the insulating member 50 (see FIGS. 5 and 6). The portions of the insulating member 50 protruded outward of the outermost wound portion of the coil 30 are bound together (see FIG. 7).

Figure 15:
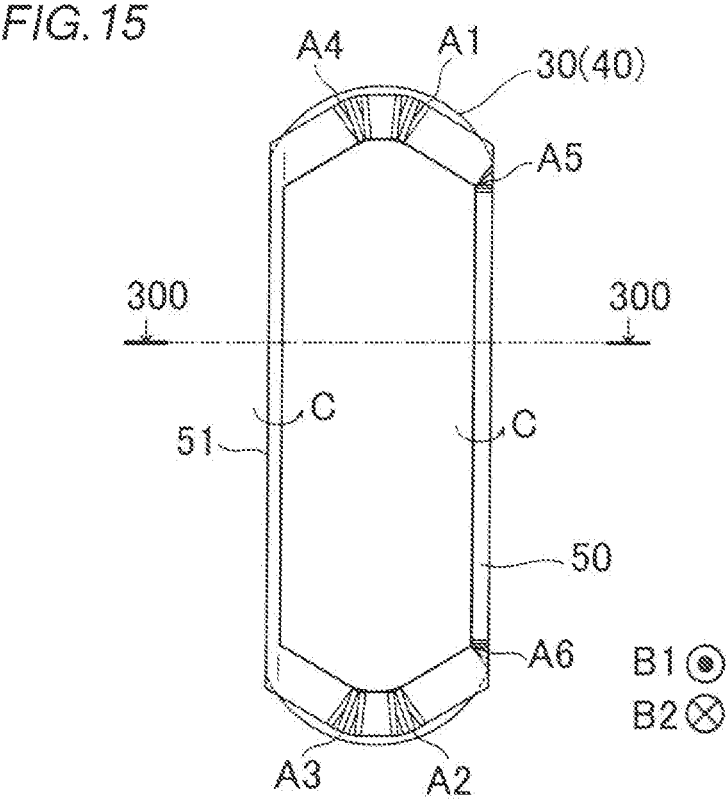
FIG. 15 is a diagram illustrating slot-held portions of the coil in FIG. 5, with the slot-held portions in a twisted state.
Figure 16:
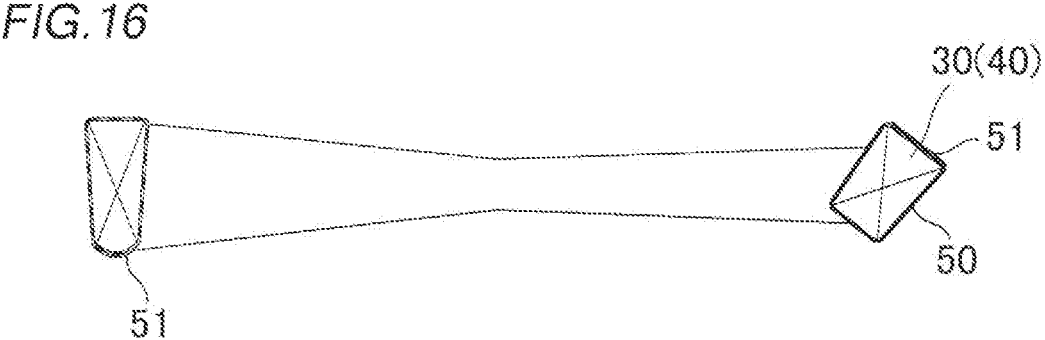
FIG. 16 is a cross-sectional view taken along the line 300-300 in FIG. 15.

As illustrated in FIGS. 15 and 16, each coil 30 including the wound conductor wire 40 includes the slot-held portion 31 located on a first side and the slot-held portion 31 located on a second side, and the slot-held portion 31 located on the first side and the slot-held portion 31 located on the second side are twisted in a C direction. Thus, a portion of the insulating member 50 corresponding to the slot-held portion 31 located on the first side (i.e., the left side of FIG. 15) and corresponding to the opening of the insulating member 50 (i.e., the bound portions or the ends 51 of the insulating member 50) is disposed toward the viewer of FIG. 15 (in a B1 direction), and a portion of the insulating member 50 corresponding to the slot-held portion 31 located on the second side (i.e., the right side of FIG. 15) and corresponding to the opening of the insulating member 50 is disposed away from the viewer of FIG. 15 (in a B2 direction).

Each coil 30 is then deformed (or curved) along a circumferential curve of the stator core 21. Each third coil 30c is deformed such that one of the slot-held portions 31c is disposed radially inward and the other slot-held portion 31c is disposed radially outward.

Each of the curved coils 30 is disposed in the associated slot 22 of the stator core 21. In this case, the insulating member 50a covering the slot-held portion 31 located in the radially inward portion of the slot 22, of the coils 30 disposed in the same slot 22, (see FIG. 7) is disposed such that the insulating member 50a is open toward the radially inward portion of the stator core 21. The insulating member 50b covering the slot-held portion 31 located in the radially outward portion of the slot 22, of the coils 30 disposed in the same slot 22, (see FIG. 7) is disposed such that the insulating member 50b is open toward the radially outward portion of the stator core 21.

Figure 17:
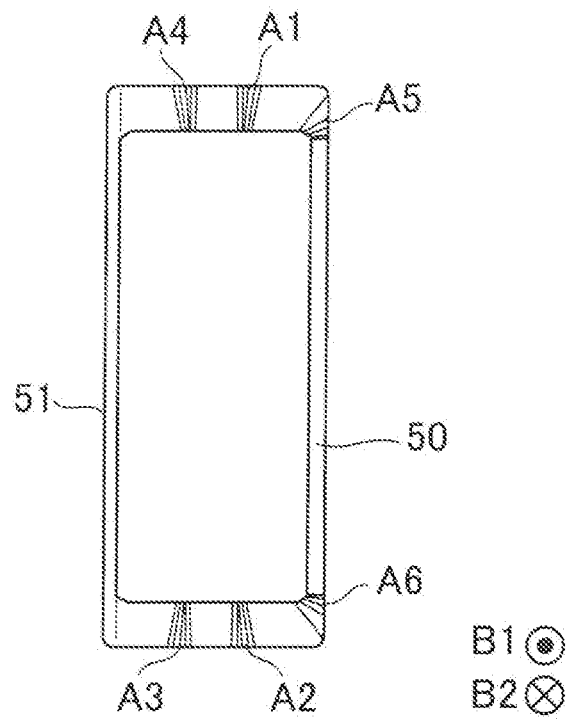
FIG. 17 is a diagram illustrating coil end portions of the coil in FIG. 15, with the coil end portions in a molded (deformed) state.
Figure 18:
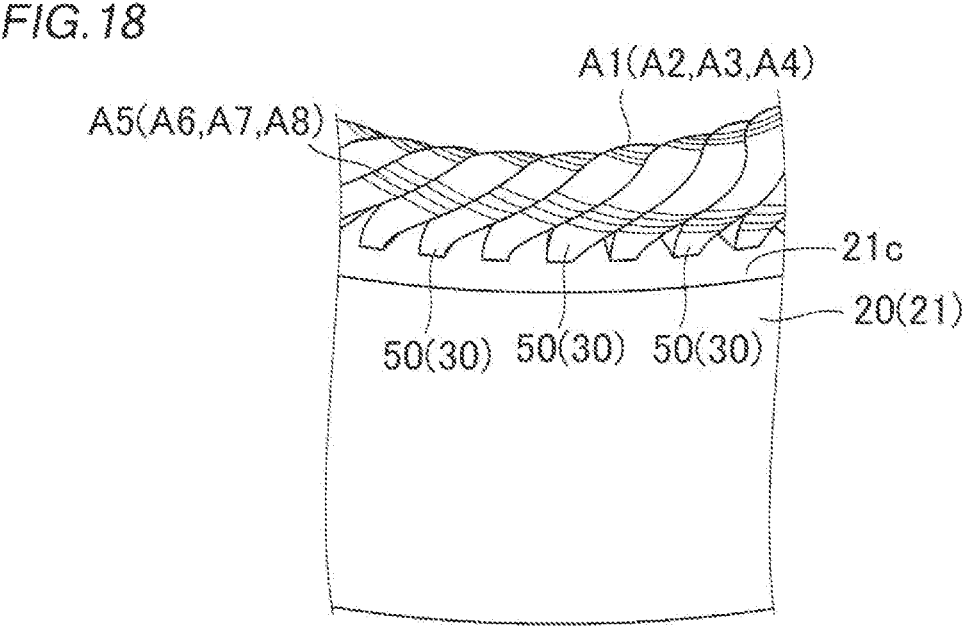
FIG. 18 is a diagram illustrating the coil end portions of the coil disposed on a stator core, with the coil end portions in the molded (deformed) state.

As illustrated in FIGS. 17 and 18, the coil end portions of each coil 30 disposed in the associated slot 22 are finally molded such that the coil end portions 32 are bent radially inward (i.e., away from the viewer of FIG. 17). In this case, each coil 30 is deformed, while the portions A1 to A8 of the insulating member 50 are folded in a bellows-like manner, so that the insulating member 50 is deformed in accordance with deformation of the slot-held portions 31 and the coil end portions 32 during molding process.

Effects of First Embodiment

The first embodiment achieves effects described below.

As previously mentioned, the first embodiment involves establishing a connection between a portion of the conductor wire 40 disposed adjacent to the winding center of the coil 30 and the power supply, and establishing a connection between a portion of the conductor wire 40 disposed outwardly away from the winding center of the coil 30 and the neutral point. When the coil end portions 32 of each coil 30 are molded after each coil 30 is inserted into the associated slot 22, outwardly disposed portions of the conductor wires 40 of the coils 30 may be protruded therefrom so as to be located close to each other or in contact with each other. Even in such a case, a potential difference between the protruded portions of the conductor wires 40 is small because the outwardly disposed portions of the conductor wires 40 are connected to the neutral point. Consequently, the first embodiment prevents occurrence of defective insulation between the coils 30 resulting from a situation where the portions of the conductor wires 40 protruded from the coils 30 come into contact with each other.

In the first embodiment, each coil 30 includes a plurality of third coils 30c (e.g., six third coils 30c in the first embodiment) each of which is a double-layer lap-wound coil as mentioned above. Thus, when the third coils 30c of different phases are disposed in the same slot 22, connecting a portion of the conductor wire 40 disposed outwardly away from the winding center to the neutral point is particularly effective in providing insulation between the coils 30.

As previously mentioned, the first embodiment involves providing the annular insulating member 50 extending outward from the center of the coil 30 such that the insulating member 50 covers the slot-held portions 31 and the coil end portions 32 of the coil 30 in a substantially U-shaped manner. Thus, the outer portion of the annular insulating member 50 is open. This enables the conductor wire 40 to be easily wound in layers stacked outward from the center.

In the first embodiment, the annular insulating member 50 has a sheet shape to be bent in a substantially U-shaped manner as mentioned above. A portion of the coil 30 corresponding to a portion of the conductor wire 40 adjacent to the center of the coil 30 and connected to the power supply is disposed inside an inner portion of the insulating member 50 bent in a substantially U-shaped manner. A portion of the coil 30 corresponding to a portion of the conductor wire 40 outwardly away from the center of the coil 30 and connected to the neutral point is disposed adjacent to the opening of the insulating member 50 bent in a substantially U-shaped manner. Thus, the portion of the coil 30 corresponding to the portion of the conductor wire 40 adjacent to the center of the coil 30 and connected to the power supply having a relatively high voltage is disposed opposite to the opening of the insulating member 50. As a result, the portion of the coil 30 corresponding to the portion of the conductor wire 40 adjacent to the center of the coil 30 and connected to the power supply having a relatively high voltage is prevented from protruding from the insulating member 50. This prevents a short circuit between the coils 30 resulting from protrusion of the portions of the coils 30 connected to the power supply having a relatively high voltage.

In the first embodiment, as mentioned above, the insulating member 50a covering the slot-held portion 31 disposed in a radially inward portion of the slot 22 is open toward the radially inward portion of the stator core 21, and the insulating member 50b covering the slot-held portion 31 disposed in a radially outward portion of the slot 22 is open toward the radially outward portion of the stator core 21. Thus, portions of the conductor wires 40 that are disposed outward in the coils 30 and are relatively likely to be protruded outward from the insulating member 50 are prevented from facing each other within the same slot 22. Consequently, the first embodiment more effectively prevents a short circuit between the coils 30.

In the first embodiment, in the sheet insulating member 50 bent in a substantially U-shaped manner, the ends 51 at the opening of the substantially U shape are protruded outward of the outermost wound portion of the coil 30 as mentioned above. Thus, the portions (i.e., the ends 51) of the insulating member 50 protruded outward of the outermost wound portion of the coil 30 are bound together so as to prevent exposure of the conductor wire 40.

In the first embodiment, the insulating member 50 is structured such that the insulating member 50 deforms in accordance with deformation of the coil 30 during its molding process as mentioned above. Thus, if each coil 30 is molded (or deformed) after each coil 30 is inserted into the associated slot 22, the first embodiment would prevent breakage of the insulating member 50 (e.g., protrusion of the conductor wire 40 from the insulating member 50) resulting from deformation of the coil 30.

In the first embodiment, at least portions of the insulating member 50 each corresponding to a region adjacent to the boundary 311 between the slot-held portion 31 and the coil end portion 32 or portions of the insulating member 50 each corresponding to a region adjacent to the top 321 of the coil end portion 32 are folded more than once as mentioned above. With the insulating member 50 provided to cover the coil 30, the regions of the folded portions of the insulating member 50 adjacent to the center are in a folded state, and the outer regions of the folded portions of the insulating member 50 are spread in the circumferential direction of the annular insulating member 50. Thus, the insulating member 50 will change from the folded state to the spread state or will return from the spread state to the folded state in accordance with deformation of the coil 30. Consequently, the first embodiment effectively prevents breakage of the insulating member 50 (e.g., protrusion of the conductor wire 40 from the insulating member 50) resulting from deformation of the coil 30.

As previously mentioned, the first embodiment involves folding the folded portions A1 to A8 of the insulating member 50 in a bellows-like manner. This makes it possible to easily change the folded state of the folded portions A1 to A8 of the insulating member 50 in accordance with deformation of the coil 30.

Second Embodiment

Figure 19:
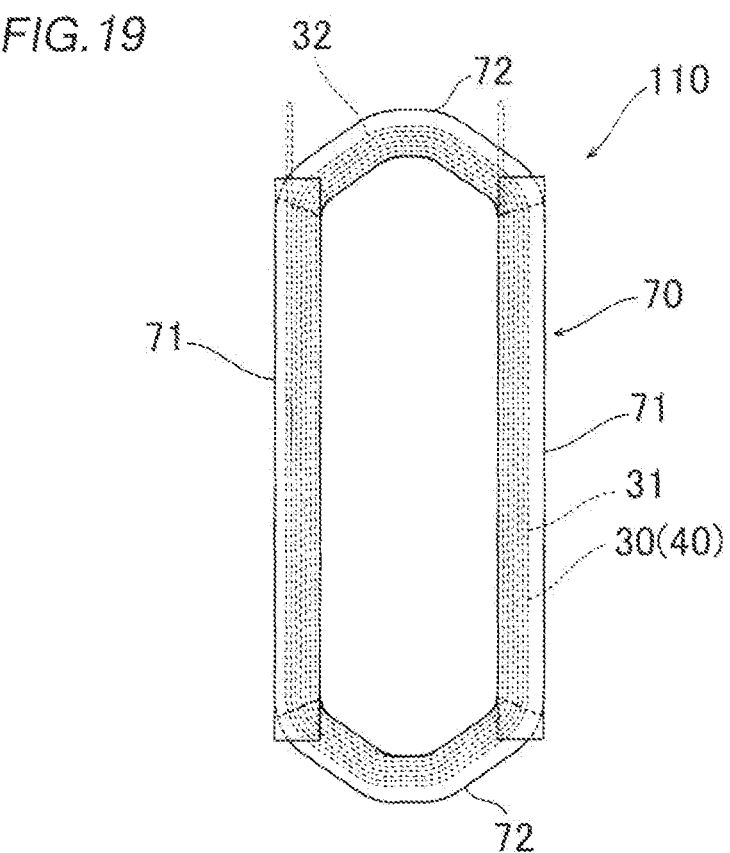
FIG. 19 is a diagram illustrating a coil (before molding) according to a second embodiment of the present disclosure.

Referring to FIG. 19, a structure of a rotating electric machine 110 according to a second embodiment will be described. Unlike the first embodiment in which the single insulating member 50 is structured to cover the slot-held portions 31 and the coil end portions 32 of the coil 30, the rotating electric machine 110 according to the second embodiment includes an insulating member 70 that is provided to separately cover the slot-held portions 31 and the coil end portions 32 of the coil 30.

The insulating member 70 of the rotating electric machine 110 according to the second embodiment includes first portions 71 each disposed in a region corresponding to the slot-held portion 31 of the coil 30. The insulating member 70 further includes second portions 72 each provided separately from the first portions 71, disposed in a region corresponding to the coil end portion 32, and partially overlapping with the first portions 71. The number of first portions 71 and the number of second portions 72 are both two.

Specifically, the first portions 71 of the insulating member 70 are each provided by bending a substantially oblong sheet insulating member in a substantially U-shaped manner. Each first portion 71 is provided such that each first portion 71 extends outward from the center of the coil 30 so as to cover the associated slot-held portion 31. The second portions 72 of the insulating member 70 are made of a ductile material, such as polytetrafluoroethylene (PTFE), for example. The second portions 72 are each provided by bending a substantially oblong sheet insulating member in a substantially U-shaped manner. Each second portion 72 is provided such that each second portion 72 extends outward from the center of the coil 30 so as to cover the associated coil end portion 32. Ends of the second portions 72 overlap with ends of the first portions 71. The insulating member 70 is not provided with a portion folded in a bellows-like manner.

Except for the configurations described above, the second embodiment is similar to the first embodiment.

Effects of Structure of Second Embodiment

The second embodiment achieves effects described below.

As mentioned above, the insulating member 70 according to the second embodiment includes: the first portions 71 each disposed in a region corresponding to the slot-held portion 31 of the coil 30; and the second portions 72 each provided separately from the first portions 71, disposed in a region corresponding to the coil end portion 32, and partially overlapping with the first portions 71. Thus, If a relative positional misalignment occurs between the first and second portions 71 and 72 of the insulating member 70 owing to molding (or deformation) of the coil 30, the second embodiment would prevent exposure of the conductor wire 40 because the first and second portions 71 and 72 are overlapping with each other.

Variations

It is to be understood that the embodiments disclosed herein are not limiting, but illustrative in all aspects. The scope of the present disclosure is defined not by the description of the embodiments, and encompasses all modifications and variations equivalent in meaning and scope.

By way of example, the portion of the conductor wire disposed outwardly away from the winding center is connected to the neutral point in the first and second embodiments. The present disclosure, however, is not limited to this example. Alternatively, the present disclosure may involve connecting a portion of the conductor wire other than the portion of the conductor wire disposed outwardly away from the winding center to the neutral point, as long as the conductor wire includes the outwardly disposed portion.

By way of example, the insulating member has a sheet shape and is bent in a substantially U-shaped manner in the first and second embodiments. The present disclosure, however, is not limited to this example. Alternatively, the insulating member may have a tube shape (e.g., a cylindrical shape).

By way of example, the insulating member according to the first embodiment (second embodiment) is structured such that the insulating member deforms in accordance with deformation of the coil during its molding process because the insulating member is folded in a bellows-like manner (the first and second portions of the insulating member are partially overlapping with each other). The present disclosure, however, is not limited to these examples. Alternatively, the present disclosure may involve causing the insulating member to deform in accordance with deformation of the coil during its molding process, with a configuration that does not involve folding the insulating member in a bellows-like manner or partial overlapping of the first and second portions.

Figure 20:
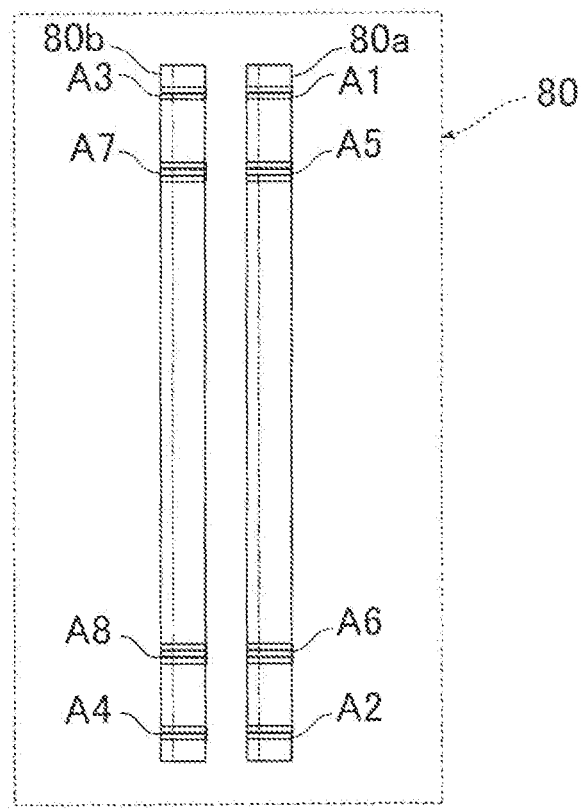
FIG. 20 is a diagram illustrating an insulating member according to a variation of the first embodiment of the present disclosure (with the insulating member bent in a substantially U-shaped manner).

By way of example, the single insulating member covers the coil in the first embodiment. The present disclosure, however, is not limited to this example. Alternatively, as illustrated in FIG. 20, an insulating member 80 divided into two insulating members (i.e., an insulating member 80a and an insulating member 80b) may be prepared, and the insulating member 80 divided into two insulating members (i.e., the insulating members 80a and 80b) may be disposed on the coil 30 (or the spool 60).

By way of example, portions of the insulating member each corresponding to a region adjacent to the boundary between the slot-held portion and the coil end portion and portions of the insulating member each corresponding to a region adjacent to the top of the coil end portion are both folded more than once in the first embodiment. The present disclosure, however, is not limited to this example. Alternatively, only portions of the insulating member each corresponding to a region adjacent to the boundary between the slot-held portion and the coil end portion or portions of the insulating member each corresponding to a region adjacent to the top of the coil end portion may be folded more than once.

By way of example, the first and second embodiments involve providing the first and second coils each of which is a single-layer lap-wound coil. The present disclosure, however, is not limited to this example. Alternatively, each coil may consist of the third coils each of which is a double-layer lap-wound coil.

By way of example, the first and second embodiments involve providing 48 slots in the stator core. The present disclosure, however, is not limited to this example. Alternatively, the present disclosure may involve providing any number of slots other than 48 in the stator core.

The invention claimed is:

1. A stator comprising:
a stator core; and
a coil disposed on the stator core, the coil being formed by winding a conductor wire, wherein
a portion of the conductor wire disposed adjacent to a winding center of the coil is connected to a power supply, and a portion of the conductor wire disposed outwardly away from the winding center of the coil is connected to a neutral point, wherein:
the coil includes a double-layer lap-wound coil that includes a pair of slot-held portions held in a slot of the stator core, one of the slot-held portions being located on a first circumferential side and disposed in a radially outward portion of the slot, the other slot-held portion being located on a second circumferential side and disposed in a radially inward portion of the slot,
the coil further includes a coil end portion protruded from an end face of the stator core facing in a rotation axis direction, and
the stator further comprises an annular insulating member disposed such that the insulating member extends outward from the center of the coil and covers the slot-held portions and completely covers the coil end portion of the coil in a substantially U-shaped manner.

2. The stator according to claim 1 wherein
the annular insulating member has a sheet shape and is bent in a substantially U-shaped manner, and
a portion of the coil corresponding to a portion of the conductor wire adjacent to the winding center of the coil and connected to the power supply is disposed inside an inner portion of the insulating member bent in a substantially U-shaped manner, and a portion of the coil corresponding to a portion of the conductor wire outwardly away from the winding center of the coil and connected to the neutral point is disposed adjacent to an opening of the insulating member bent in a substantially U-shaped manner.

3. The stator according to claim 2, wherein
the coil is plural in number, the coils being disposed adjacent to each other,
the slot-held portion of one of the adjacent coils and the slot-held portion of the other adjacent coil are disposed in the same slot, and
a first insulating member covering the slot-held portion disposed in a radially inward portion of the same slot is open toward a radially inward portion of the stator core, and a second insulating member covering the slot-held portion disposed in a radially outward portion of the slot is open toward a radially outward portion of the stator core.

4. The stator according to claim 3, wherein
in the insulating member having a sheet shape and bent in a substantially U-shaped manner, an end at the opening of a substantially U shape is protruded outward of an outermost wound portion of the coil.

5. The stator according to claim 4, wherein
the insulating member is structured such that the insulating member deforms in accordance with deformation of the coil during its molding process.

6. The stator according to claim 5, wherein
at least a portion of the insulating member corresponding to a region adjacent to a boundary between the slot-held portion and the coil end portion or a portion of the insulating member corresponding to a region adjacent to a top of the coil end portion is folded more than once, and
with the insulating member disposed to cover the coil, a region of the folded portion of the insulating member adjacent to the center is in a folded state, and an outer region of the folded portion of the insulating member is spread in a circumferential direction of the annular insulating member.

7. The stator according to claim 6, wherein
the folded portion of the insulating member is folded in a bellows manner.

8. The stator according to claim 5, wherein
the insulating member includes
a first portion disposed in a region corresponding to one of the slot-held portions of the coil, and
a second portion provided separately from the first portion, disposed in a region corresponding to the coil end portion, and partially overlapping with the first portion.

9. The stator according to claim 2, wherein
in the insulating member having a sheet shape and bent in a substantially U-shaped manner, an end at the opening of a substantially U shape is protruded outward of an outermost wound portion of the coil.

10. A rotating electric machine comprising:
a rotor; and
a stator disposed to face the rotor, wherein
the stator includes
a stator core, and
a coil disposed on the stator core, the coil being formed by winding a conductor wire, and
a portion of the conductor wire disposed adjacent to a winding center of the coil is connected to a power supply, and a portion of the conductor wire disposed outwardly away from the winding center of the coil is connected to a neutral point, wherein:

the coil includes a double-layer lap-wound coil that includes a pair of slot-held portions held in a slot of the stator core, one of the slot-held portions being located on a first circumferential side and disposed in a radially outward portion of the slot, the other slot-held portion being located on a second circumferential side and disposed in a radially inward portion of the slot, the coil further includes a coil end portion protruded from an end face of the stator core facing in a rotation axis direction, and the stator further comprises an annular insulating member disposed such that the insulating member extends outward from the center of the coil and covers the slot-held portions and completely covers the coil end portion of the coil in a substantially U-shaped manner.

\* \* \* \* \*